(12) United States Patent
Lu et al.

(10) Patent No.: US 12,153,732 B2
(45) Date of Patent: Nov. 26, 2024

(54) GAZE POINT ESTIMATION METHOD, DEVICE, AND ELECTRONIC DEVICE

(71) Applicant: BEIHANG UNIVERSITY, Beijing (CN)

(72) Inventors: Feng Lu, Beijing (CN); Yiwei Bao, Beijing (CN); Qinping Zhao, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 484 days.

(21) Appl. No.: 17/545,932

(22) Filed: Dec. 8, 2021

(65) Prior Publication Data
US 2022/0179485 A1 Jun. 9, 2022

(30) Foreign Application Priority Data
Dec. 9, 2020 (CN) .......................... 202011428967.1

(51) Int. Cl.
*G06F 3/01* (2006.01)
*G06N 3/02* (2006.01)
(Continued)

(52) U.S. Cl.
CPC .............. *G06F 3/013* (2013.01); *G06N 3/02* (2013.01); *G06V 10/806* (2022.01); *G06V 40/168* (2022.01); *G06V 40/18* (2022.01)

(58) Field of Classification Search
CPC ........ G06F 3/013; G06F 18/10; G06F 18/253; G06N 3/02; G06N 3/045; G06N 3/048;
(Continued)

(56) References Cited

U.S. PATENT DOCUMENTS 11,238,340 B1* 2/2022 Anderson ................ G06N 3/02
2019/0080474 A1* 3/2019 Lagun ....................... G06T 7/74
(Continued)

FOREIGN PATENT DOCUMENTS

| CN | 106354264 A | 1/2017 |
| CN | 107203782 A | 9/2017 |

(Continued)

OTHER PUBLICATIONS

Krafka et al, "Eye Tracking for Everyone" 2016 IEEE Conference on Computer Vision and Pattern Recognition, pp. 1-8 (Year: 2016).*
(Continued)

*Primary Examiner* — Kathleen Y Dulaney
(74) *Attorney, Agent, or Firm* — J.C. PATENTS

(57) ABSTRACT

The present application provides a gaze point estimation method, device, and an electronic device. The method includes: acquiring user image data; acquiring a facial feature vector according to a preset first convolutional neural network and the facial image; acquiring a position feature vector according to a preset first fully connected network and the position data; acquiring a binocular fusion feature vector according to a preset eye feature fusion network, the left-eye image and the right-eye image; and acquiring position information about a gaze point of a user according to a preset second fully connected network, the facial feature vector, the position feature vector, and the binocular fusion feature vector. In this technical solution, relation between eye images and face images is utilized to achieve accurate gaze point estimation.

14 Claims, 7 Drawing Sheets

(51) Int. Cl.
*G06V 10/80* (2022.01)
*G06V 40/16* (2022.01)
*G06V 40/18* (2022.01)

(58) Field of Classification Search
CPC .... G06V 10/806; G06V 40/168; G06V 40/18; G06V 10/82; G06V 40/165; G06V 40/19
USPC .................................. 382/103, 156; 351/209
See application file for complete search history.

(56) References Cited

U.S. PATENT DOCUMENTS

| | | | |
|---|---|---|---|
| 2019/0130600 A1* | 5/2019 | Lin | G06V 10/764 |
| 2019/0251707 A1* | 8/2019 | Gupta | G06T 9/002 |
| 2019/0303722 A1* | 10/2019 | Linden | G06F 18/217 |
| 2020/0004333 A1* | 1/2020 | Lee | G06V 40/18 |
| 2020/0202561 A1* | 6/2020 | Liu | G06T 7/73 |
| 2021/0181837 A1* | 6/2021 | Jiang | G06F 3/011 |
| 2021/0182609 A1* | 6/2021 | Arar | G06V 20/597 |
| 2021/0183072 A1* | 6/2021 | Puri | G06T 7/70 |
| 2022/0050521 A1* | 2/2022 | Drozdov | G06V 40/193 |
| 2022/0198789 A1* | 6/2022 | Kassner | G06V 40/19 |

FOREIGN PATENT DOCUMENTS

| | | |
|---|---|---|
| CN | 107545302 A | 1/2018 |
| CN | 108229350 A | 6/2018 |
| CN | 108595011 A | 9/2018 |
| CN | 108846355 A | 11/2018 |
| CN | 109409298 A | 3/2019 |
| CN | 109961473 A | 7/2019 |
| CN | 110046546 A | 7/2019 |
| CN | 110765839 A | 2/2020 |
| CN | 111178278 A | 5/2020 |
| CN | 111796681 A | 10/2020 |

OTHER PUBLICATIONS

First Office Action of CN2020114289671.
NPL: "A New Methodology for Determining Point-of-Gaze in Head-Mounted Eye Tracker", Chinese Journal of Scientific Instrument, vol. 30, No. 6, Jun. 2009, pp. 720-724.
Notice of Allowance of CN202011428967.1.

* cited by examiner

GAZE POINT ESTIMATION METHOD, DEVICE, AND ELECTRONIC DEVICE

CROSS-REFERENCE TO RELATED APPLICATIONS

This application claims priority to Chinese Patent Application No. 202011428967.1, filed with the China National Intellectual Property Administration on Dec. 9, 2020, which is hereby incorporated by reference in its entirety.

TECHNICAL FIELD

The present application relates to the technical field of eye tracking and in particular to a gaze point estimation method, device, and an electronic device.

BACKGROUND

Eye tracking technology refers to the tracking and estimation of the position point where the user's eyes are gazing. When the user is looking at the screen, it can be determined which position point on the screen the user is looking at by analyzing the user's facial image. The eye tracking technology is widely used in fields such as human-machine interaction and traffic safety.

In the prior art, the method for tracking and estimation the user's gaze point is mostly based on the appearance. This method calculates the position of the user's gaze point according to the pixel value of the captured user's facial image. Specifically, it takes the user's facial image as the input, and directly estimates the two-dimensional coordinate of the user's gaze point on the screen through the neural network.

However, in the prior art, when gaze point estimation is performed by a neural network, the user's left-eye feature vector and right-eye feature vector are directly spliced. The spliced vector obtained after splicing will lose part of the spatial information during subsequent stretching, resulting in low accuracy of the position point estimation.

SUMMARY

The present application provides a gaze point estimation method, device, and an electronic device, which are used to solve the problem of low accuracy of the existing gaze point estimation.

In a first aspect, an embodiment of the present application provides a gaze point estimation method, including:
acquiring user image data, wherein the user image data comprises a facial image, a left-eye image, a right-eye image, and eye-face position data;
acquiring a facial feature vector according to a preset first convolutional neural network and the facial image;
acquiring a position feature vector according to a preset first fully connected network and the position data;
acquiring a binocular fusion feature vector according to a preset eye feature fusion network, the left-eye image and the right-eye image; and
acquiring position information about a gaze point of a user according to a preset second fully connected network, the facial feature vector, the position feature vector, and the binocular fusion feature vector.

In a possible design of the first aspect, the preset first convolutional neural network comprises a facial feature extraction network and a facial vector conversion network, the acquiring the facial feature vector according to the preset first convolutional neural network and the facial image comprises:
obtaining a facial feature map by performing feature extraction on the facial image through the facial feature extraction network;
obtaining an initial facial feature vector by dimensionally stretching the facial feature map; and
inputting the facial initial feature vector to the facial vector conversion network, and converting to obtain a facial feature vector with a preset size.

In another possible design of the first aspect, the facial feature extraction network comprises more than two successively connected facial feature extraction layers, and the facial feature extraction layers are used for convolution processing, grouping normalization processing, activation processing, maximum pooling processing, and attention weight assignment processing.

In a yet possible design of the first aspect, the preset eye feature fusion network comprises an eye feature extraction network and a feature fusion network, and the acquiring the binocular fusion feature vector according to the preset eye feature fusion network, the left-eye image and the right-eye image comprises:
obtaining a left-eye feature map and a right-eye feature map by performing feature extraction on the left-eye image and the right-eye image through the eye feature extraction network;
obtaining a stacked feature map by stacking the left-eye feature map and the right-eye feature map;
obtaining a binocular fusion feature map by performing feature fusion on the stacked feature map through the feature fusion network; and
obtaining the binocular fusion feature vector by stretching and length converting the binocular fusion feature map.

In a yet possible design of the first aspect, the eye feature extraction network comprises more than two successively connected eye feature extraction layers, and the eye feature extraction layers are used for convolution processing, activation processing, group normalization processing, maximum pooling processing, preset adaptive normalization processing, and attention weight assignment processing, the feature fusion network comprises at least one feature fusion layer, wherein the feature fusion layer is used for attention weight assignment processing, compression activation processing, convolution processing, activation processing, and preset adaptive normalization processing.

In a yet possible design of the first aspect, the obtaining the stacked feature map by stacking the left-eye feature map and the right-eye feature map comprises:
acquiring left-eye feature maps and right-eye feature maps output by different eye feature extraction layers; and
obtaining the stacked feature map by stacking the left-eye feature maps and right-eye feature maps output by different eye feature extraction layers.

In a yet possible design of the first aspect, the preset adaptive normalization processing comprises:
acquiring a feature map to-be-processed, wherein the feature map to-be-processed is used for the preset adaptive normalization processing;
obtaining a splicing vector by splicing the facial feature vector and the position feature vector;
obtaining a scaling parameter vector and an offset parameter vector by inputting the splicing vector into a preset fully connected layer;

obtaining a normalized feature map by normalizing the feature map to be processed;

calculating a final feature map according to the scaling parameter vector, the offset parameter vector, and the normalized feature map, wherein the final feature map is a feature map after the preset adaptive normalization processing is completed.

In a yet possible design of the first aspect, the calculating the final feature map according to the scaling parameter vector, the offset parameter vector, and the normalized feature map comprises:

$$[W_{shift}, W_{scale}] = \text{LeakyRelu}(L(f_{rects})f_{face}))$$

$$f_{out} = W_{scale} * GN(f_{in}) + W_{shift}$$

in the above equation, $f_{rects}$ is the position feature vector, $f_{face}$ is the facial feature vector, LeakyRelu ( ) is a preset leaky rectified linear activation unit, L ( ) denotes a fully connected layer, $W_{scale}$ is the scaling parameter vector, $f_{in}$ is the feature map to be processed, $f_{out}$ is the final feature map, GN ( ) denotes a preset normalization processing function, and $W_{shift}$ is the offset parameter vector.

In a second aspect, an embodiment of the present application provides a gaze point estimation apparatus, including:
a data acquiring module, configured to acquire user image data, wherein the user image data comprises a facial image, a left-eye image, a right-eye image, and eye-face position data;
a facial vector acquiring module, configured to acquire a facial feature vector according to a preset first convolutional neural network and the facial image;
a position vector acquiring module, configured to acquire a position feature vector according to a preset first fully connected network and the position data;
an eye vector acquiring module, configured to acquire a binocular fusion feature vector according to a preset eye feature fusion network, the left-eye image and the right-eye image; and
a position point acquiring module, configured to acquire a gaze point of a user according to a preset second fully connected network, the facial feature vector, the position feature vector, and the binocular fusion feature vector.

In a third aspect, an embodiment of the present application provides an electronic device, including: a memory and at least one processor;
the memory is stored with computer-executed instructions; and
the computer-executed instructions stored in the memory are executed by the at least one processor to enable the at least one processor to perform the above-mentioned method.

In a fourth aspect, an embodiment of the present application provides a computer-readable storage medium, the computer-readable storage medium is stored with computer instructions, and when the computer instructions are executed by a processor, the above-mentioned method is implemented.

In the gaze point estimation method, apparatus and the electronic device provided by the embodiments of the present application, by performing feature extraction on the left-eye image and the right-eye image through a convolutional neural network and fusing the extracted left-eye feature map and the right-eye feature map to obtain a binocular fusion feature vector, more complete spatial information can be preserved, and the calculation accuracy of the user's gaze point position can be improved, and the user's gaze point position can be calculated more accurately.

DESCRIPTION OF EMBODIMENTS

Figure 1:
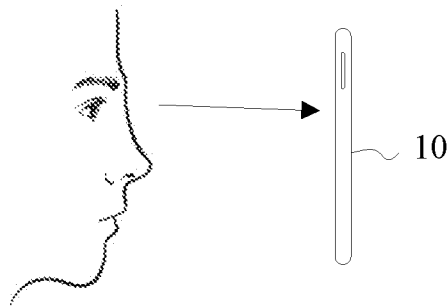
FIG. 1 is a schematic diagram of a scene of a gaze point estimation method provided by an embodiment of the present application.

In order to make the purpose, technical solutions and advantages of the embodiments of the present application clearer, the technical solutions in the embodiments of the present application will be described clearly and completely in conjunction with the accompanying drawings in the embodiments of the present application. Obviously, the described embodiments are merely a part of embodiments of the present application, but not all of the embodiments. Based on the embodiments in the present application, all other embodiments obtained by those skilled in the art without creative work shall fall within the protection scope of the present application.

In the prior art, there is another method for tracking and estimation the user's gaze point, which is a model-based method. Specifically, a three-dimensional user facial model is established based on the user's eye and facial feature points obtained by face detection, the user's line of sight direction is calculated based on the geometric relationship, and the gaze point position is further obtained based on the intersection of the line of sight direction with the screen. However, because the result of the appearance-based method is more accurate, it has low dependence on calibration (in the problem of line of sight estimation, the system is calibrated by requiring new users to look at different positions on the screen, and the accuracy of the line of sight estimation for the user can be improved), and at the same time, it has better compatibility with low-resolution images, so it is most widely used.

But the appearance-based method specifically uses the neural network method, where the user's left-eye image and right-eye image is collected, then the eye feature map is obtained through the convolution layer (the dimensions of the feature map is C*H*W, C is the number of the channels of the feature map, H is the height of the feature map, W is the width of the feature map), and the left-eye feature vector and right-eye feature vector are obtained by stretching respectively (the size of the feature vector is 1*N, N is the feature vector dimension), and then the left-eye feature vector and right-eye feature vector are directly spliced, and the vertical distance from the user's gaze point to the horizontal of the screen camera is finally output through a series of fully connected layer conversion processing. This method is easy to lose part of the spatial information because the left-eye feature vector and the right-eye feature vector are directly spliced and fused with a fully connected layer, and the intrinsic relationship between the user's face and eye is also ignored, resulting in inaccurate gaze estimation results.

For the above problems, embodiments of the present application provide a gaze point estimation method, apparatus, an electronic device, and a storage medium. The technical concept is as follows: determining the face-eye position data in combination with the user's facial image, then stacking the left-eye feature maps and the right-eye feature maps from different convolutional layers together, and performing feature vector fusion for the left-eye and the right-eye on the stacked feature maps through another convolutional layer. The stacking method can take advantage of the features of the appearance and structural consistency of the left and right eyes of the person. The feature maps of different convolutional layers are stacked together to ensure that the spatial information and high-dimensional feature information will not be lost when the feature vectors are fused, and the fusion of feature vectors through the convolutional layer can have better spatial and feature information extraction capabilities. Meanwhile, in the process of extracting the eye feature maps, a preset adaptive normalization process is used to take the facial feature vector, the eye-face position data as reference inputs to achieve recalibration in the process of eye feature extraction. Finally, the position data, facial feature vector, and eye fusion feature vector are input to the fully connected layer to estimate the position of the user's gaze point, which can improve the accuracy of the gaze point estimation.

FIG. 1 is a schematic diagram of a scene of a gaze point estimation method provided by an embodiment of the present application. As shown in FIG. 1, taking the screen of mobile terminal 10 as an example, when a user gazes at the screen of mobile terminal 10, the camera of mobile terminal 10 captures the image data of the user, and then a facial image, a left-eye image, a right-eye graphic, and eye-face position data of a user are obtained by cropping from the image data, where the eye-face position data represents the two-dimensional coordinates of the top-left and bottom-right vertices of the three images, namely the facial image, the left-eye image and the right-eye image in the original image.

Figure 2:
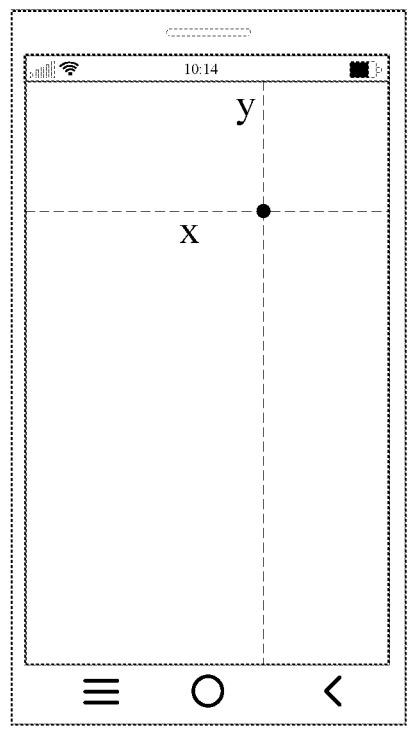
FIG. 2 is a schematic diagram of an interface of a mobile terminal provided by an embodiment of the present application.

FIG. 2 is a schematic diagram of an interface of a mobile terminal provided by an embodiment of the present application, as shown in FIG. 2, after acquiring the facial image, the left-eye image, the right-eye image and the eye-face position data of the user, the mobile terminal 20 calculates the horizontal and vertical distances between the gaze point (black marked point in FIG. 2) of the user on the mobile terminal and the front camera of the mobile terminal through the gaze point estimation method.

Hereinafter, the technical solutions of this application are described in detail through specific embodiments. It should be noted that these specific embodiments below can be combined, and the same or similar concepts or processes may not be repeated in some embodiments.

Figure 3:
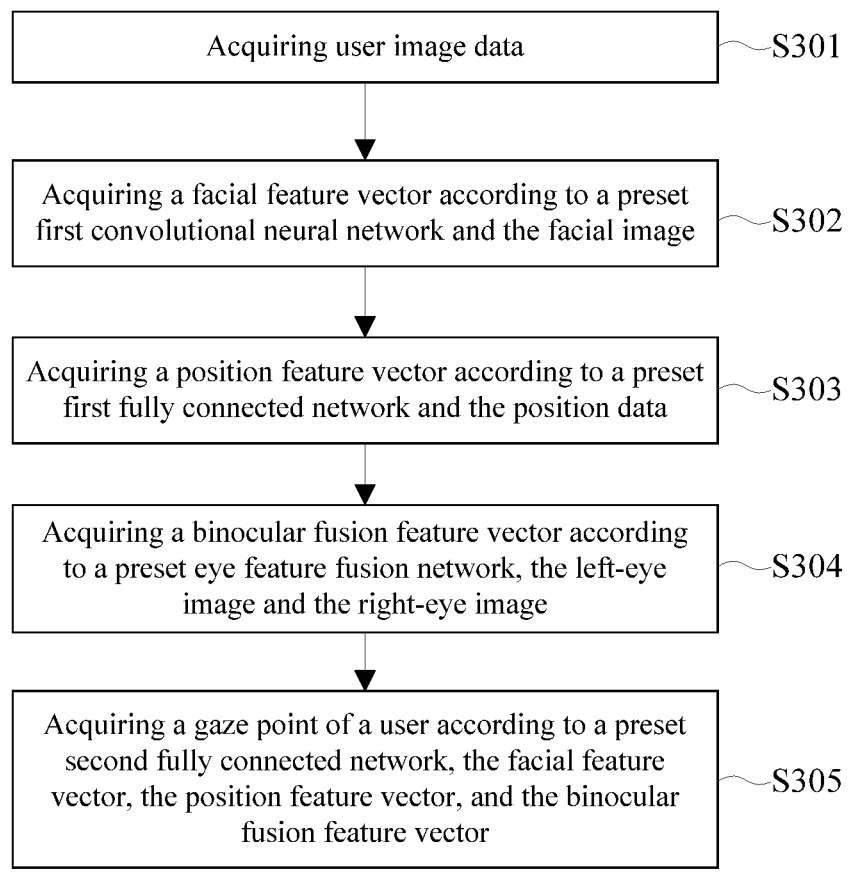
FIG. 3 is a schematic flowchart of a first embodiment of a gaze point estimation method provided by an embodiment of the present application.

FIG. 3 is a schematic flowchart of a first embodiment of a gaze point estimation method provided by an embodiment of the present application, which can be applied to both the mobile terminal described above and other devices with display interfaces and cameras, as shown in FIG. 3, the estimation method may include the following steps:

S301, acquiring user image data.

The user image data includes a facial image, a left-eye image, a right-eye image, and eye-face position data. Exemplarily, the user image data can be obtained through a camera, the camera takes a picture of the user's face, and the captured image can be processed by the corresponding image processing software for image processing, etc., to obtain the facial image, left-eye image, and right-eye image of the user.

Exemplarily, the pixel values of the facial image, the left-eye image, and the right-eye image are all normalized from [0, 255] to [0, 1], the resolution of the facial image is reset to 224*224, the resolution of the left-eye image and the right-eye image resolution is reset to 112*112, and all the above three images are 3-channel RGB images.

The eye-face position data is the two-dimensional coordinates of the top-left and bottom-right vertices of the three images, namely the facial image, the left-eye image and the right-eye image in the original image, and for the eye-face position data of the user, the coordinates thereof are divided by the corresponding edge length of the original image, which usually varies to the range of [0, 1].

Exemplarily, when the user gazes at the screen of the mobile phone, the user can be photographed through the front camera of the mobile phone to obtain the captured image.

S302, acquiring a facial feature vector according to a preset first convolutional neural network and the facial image.

Specifically, the facial image is used as the input of the preset first convolutional neural network, and the preset first convolutional neural network is used to perform image feature extraction on the facial image, and then to perform stretching and size conversion on the facial feature map after the facial feature map is obtained by the extraction, and finally to output the facial feature vector.

Figure 4:
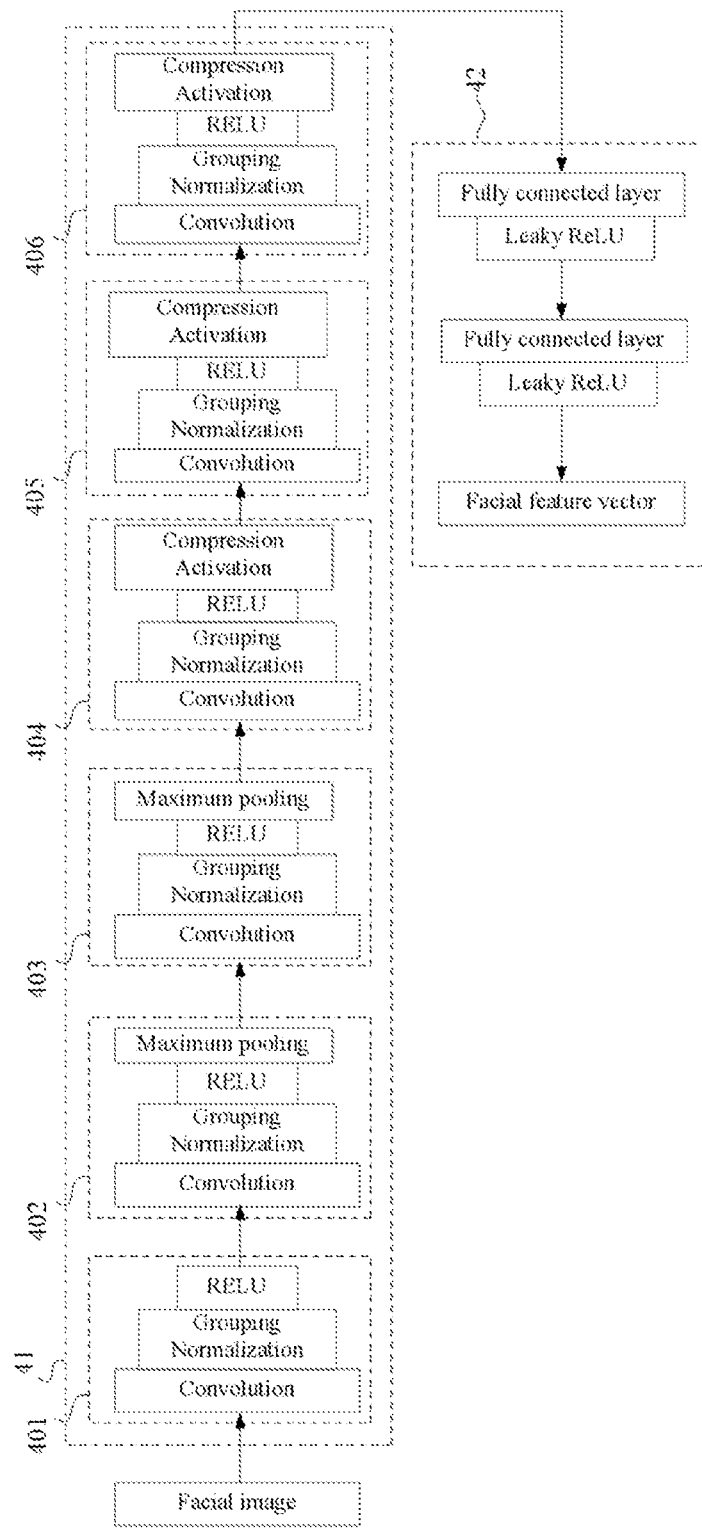
FIG. 4 is a schematic structural diagram of a preset first convolutional neural network provided by an embodiment of the present application.

Exemplarily, in some embodiments, FIG. 4 is a schematic structural diagram of a preset first convolutional neural network provided by an embodiment of the present application, which can be divided into two parts as shown in FIG. 4: facial feature extraction network 41 and facial vector conversion network 42, where the facial feature extraction network 41 includes several facial feature extraction layers, which can be sequentially divided into the first facial feature extraction layer 401, the second facial feature extraction layer 402, the third facial feature extraction layer 403, the fourth facial feature extraction layer 404, the fifth facial feature extraction layer 405 and the sixth facial feature extraction layer 406 according to the connection order, and the sixth facial feature extraction layer 406 is connected to the facial vector conversion network 42.

Each of the facial feature extraction layers can perform convolution processing, group normalization processing, and activation processing. On this basis, the second facial feature extraction layer 402 and the third facial feature extraction layer 403 can further perform maximum pooling processing, and the fourth facial feature extraction layer 404, the fifth facial feature extraction layer 405, and the sixth facial feature extraction layer 406 may further perform attention weight assignment processing.

Exemplarily, when the convolution processing is performed, the sizes of the convolution kernels of the first facial feature extraction layer 401 to the sixth facial feature extraction layer 406 are (5, 5, 5, 3, 3, 3) in order, the step lengths are (2, 1, 1, 1, 2, 2) in order, the paddings are (0, 0, 2, 1, 0, 0) in order, and the numbers of the output channels are (48, 96, 128, 192, 128, 64) in order.

Exemplarily, when the second facial feature extraction layer 402 and the third facial feature extraction layer 403 are used for the maximum pooling processing, the maximum pooling with core size of 3 and step length of 2 can be adopted.

Exemplarily, when performing activation processing, a rectified linear unit (ReLU) may be used as the activation processing function.

Exemplarily, the squeeze-and-excitation layer can be used to realize attention weight assignment processing, which is specifically used to dynamically assign weights to different facial features according to the facial appearance to improve the feature extraction capability.

Exemplarily, the facial vector conversion network 42 includes two fully connected layers, each fully connected layer uses a Leaky ReLU as the activation layer, specifically, the output lengths of the two fully connected layers are 128 and 64, respectively.

Optionally, in some embodiments, after the facial feature extraction network 41 performs feature extraction on the facial image, a facial feature map is obtained, and then the facial feature map is dimensionally stretched to obtain the initial facial feature vector after the stretching, and the initial facial feature vector is dimensionally converted by the facial vector conversion network 42 to obtain a facial feature vector satisfying a preset size.

Exemplarily, the dimensions of the facial feature map can be 64*5*5 (the dimensions of the feature map are C*H*W, C is the number of the channels of the feature map, H is the height of the feature map, W is the width of the feature map).

Exemplarily, the preset size can be 1*64 (the dimensions of the feature vector are 1*N, and N is the feature vector dimension).

S303, acquiring a position feature vector according to a preset first fully connected network and the position data.

Specifically, the position data is used as the input of the preset first fully connected network, and the position data is converted into a position feature vector through the first fully connected network, exemplarily, the dimensions of the position feature vector is 1*64.

Figure 5:
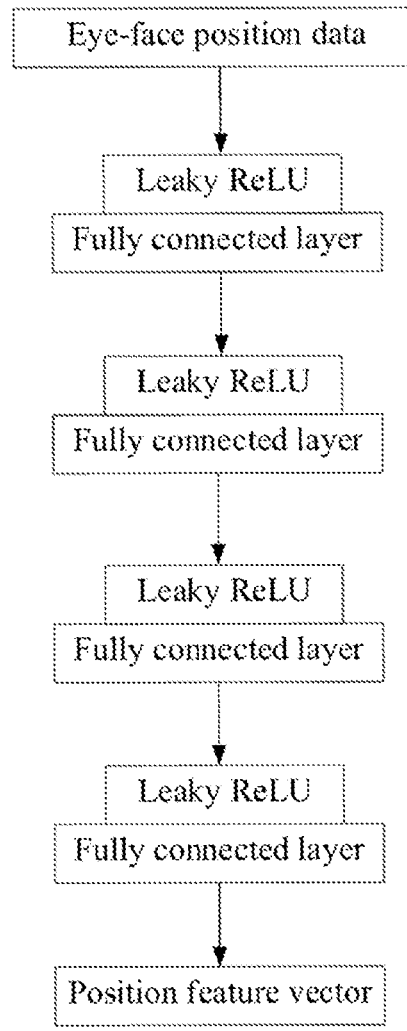
FIG. 5 is a schematic structural diagram of a preset first fully connected network provided by an embodiment of the present application.

Optionally, in some embodiments, FIG. 5 is a schematic structural diagram of a preset first fully connected network provided by an embodiment of the present application, which includes four fully connected layers as shown in FIG. 5. Exemplarily, the output lengths of the four fully connected layers are (64, 96, 128, 64) in order.

S304, acquiring a binocular fusion feature vector according to a preset eye feature fusion network, the left-eye image and the right-eye image.

Specifically, the left-eye image and the right-eye image are used as the input of the preset eye feature fusion network, and the binocular fusion feature vector is obtained by calculating and outputting through the preset eye feature fusion network. It should be noted that when the preset eye feature fusion network processes the left-eye image and the right-eye image, the same set of parameters is used together. At this time, due to the symmetry between the left-eye and the right-eye, the right-eye image needs to be horizontally flipped and then input into the preset eye feature fusion network.

Optionally, in some embodiments, a left-eye feature map is obtained through feature extraction of a left-eye image through a preset eye feature fusion network, and a right-eye feature map is obtained through feature extraction of a right-eye image, and then the left-eye feature map and the right-eye feature map are stacked to obtain a stacked feature map, and then the stacked feature map is fused by the convolution layer of the preset eye feature fusion network to obtain a binocular fusion feature map. Then the binocular fusion feature map is input into the fully connected layer of the preset eye feature fusion network, and converted to obtain the binocular fusion feature vector.

Figure 6:
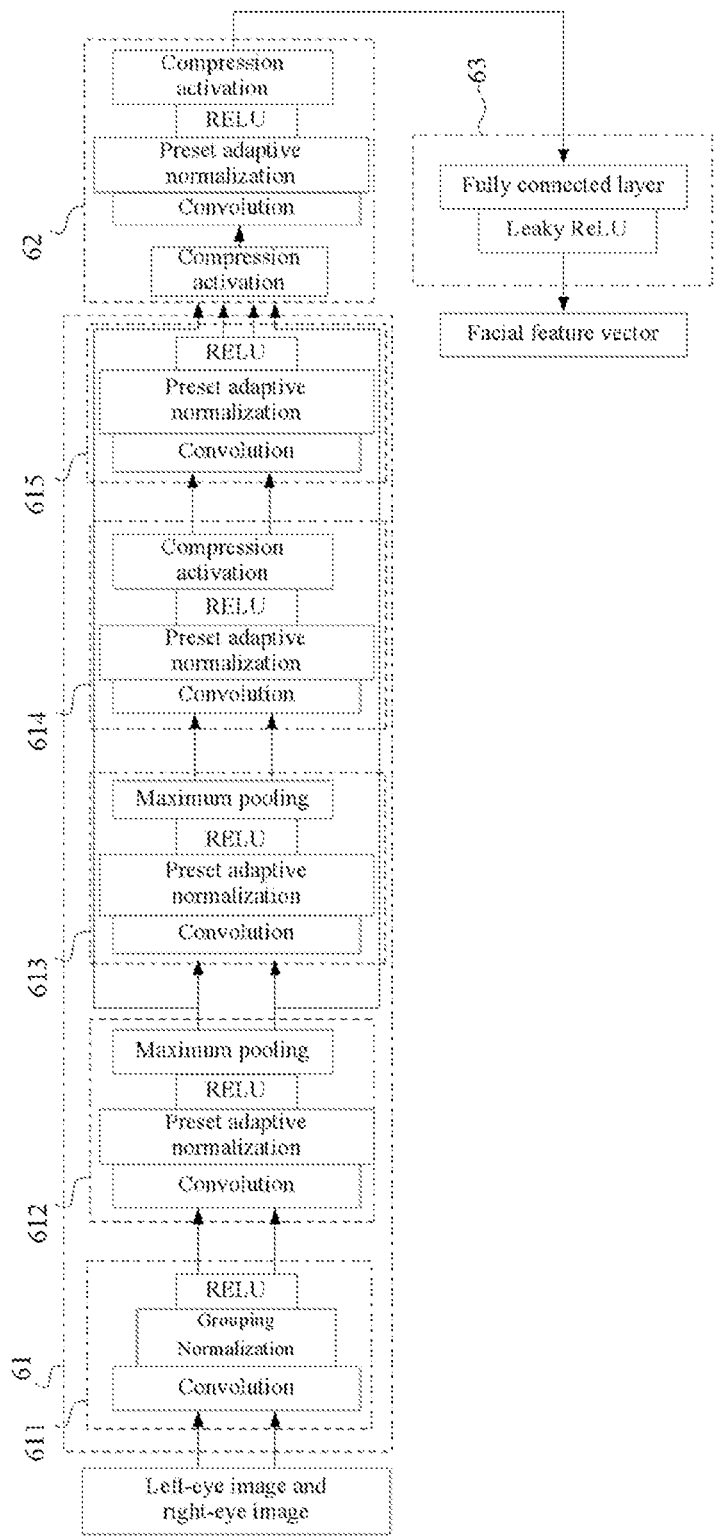
FIG. 6 is a schematic structural diagram of a preset eye feature fusion network provided by an embodiment of the present application.

Exemplarily, FIG. 6 is a schematic structural diagram of a preset eye feature fusion network provided by an embodiment of the present application, the preset eye feature fusion network includes an eye feature extraction network 61, a feature fusion network 62, and a fully connected layer network 63 as shown in FIG. 6. The eye feature extraction network 61 includes more than two successively connected facial feature extraction layers which are used for convolution processing, activation processing, group normalization processing, maximum pooling processing, preset adaptive normalization processing, and attention weight assignment processing, and the feature fusion network 62 includes at least one feature fusion layer which is used for attention weight assignment processing, compression activation processing, convolution processing, activation processing, and preset adaptive normalization processing.

Exemplarily, the eye feature extraction network 61 includes five successively connected eye feature extraction layers, namely, the first eye feature extraction layer 611 to the fifth eye feature extraction layer 615. The feature fusion network 62 is connected to the fifth eye feature extraction layer 615. The fully connected layer network 63 is used for performing the vector length conversion.

Each eye feature extraction layer can perform convolutional processing and activation processing. Exemplarily, when the first eye feature extraction layer 611 to the fifth eye feature extraction layer 605 are performing convolution processing, the sizes of the convolution kernel are (5, 5, 5, 3, 3) in order, the step lengths are (2, 1, 1, 1, 1) in order, the paddings are (0, 0, 1, 1, 1) in order, and the numbers of the output channels are (24, 48, 64, 128, 64) in order. When performing the activation processing, ReLU can be used as the activation layer.

The first eye feature extraction layer 611 may also perform group normalization processing.

The second eye feature extraction layer 612 and the third eye feature extraction layer 613 may also perform maximum pooling processing. For example, when the second eye feature extraction layer 612 and the third eye feature extraction layer 613 performs the maximum pooling processing, the maximum pooling with core size of 3 and step length of 2 can be adopted.

The fourth eye feature extraction layer 614 may also perform attention weight assignment processing, and exemplarily, a squeeze-and-excitation layer may be used to achieve attention weight assignment.

The second eye feature extraction layer 612 to the fifth eye feature extraction layer 615 may also perform preset adaptive normalization processing.

After the fifth eye feature extraction layer 615 completes the feature extraction, a left-eye feature map and a right-eye feature map are output by the fifth eye feature extraction layer 615, and then, a stacked feature map is obtained by stacking the left-eye feature map and the right-eye feature map with the left-eye feature map and a right-eye feature map output by the previous eye feature extraction layers, which is used as an input to the feature fusion network 62, and the eye feature fusion is performed by the feature fusion network 62.

Optionally, in some embodiments, the compressing activation processing, the convolutional processing, and the preset adaptive normalization processing can be performed by the feature fusion network 62. Specifically, the feature fusion network 62 first assigns weights to each channel of the input stacked feature map through the compression activation processing, performs the convolution processing using a convolution with the convolutional kernel size of 3, the step length of 2, the output channel number of 64, and the padding of 1, extracts to obtain the binocular fusion feature, and obtains a binocular fusion feature map with a channel number of 64 and a size of 5*5 through the preset adaptive normalization processing and the compression activation processing.

Optionally, in some embodiments, when performing a preset adaptive normalization processing, it is necessary to input a feature map to-be-processed, and the feature map to-be-processed is used for the preset adaptive normalization processing. Through performing the normalization processing on the feature map to-be-processed, the facial feature vector and the position feature vector obtained above are spliced to obtain a spliced vector, and then the final feature map is calculated as the output result of the preset adaptive normalization processing according to the spliced vector and the normalized feature.

Exemplarily, the preset adaptive normalization process includes: acquiring a feature map to-be-processed, wherein the feature map to-be-processed is used for the preset adaptive normalization processing; obtaining a splicing vector by splicing the facial feature vector and the position feature vector; obtaining a scaling parameter vector and an offset parameter vector by inputting the splicing vector into a preset fully connected layer; obtaining a normalized feature map by normalizing the feature map to be processed; and calculating a final feature map according to the scaling parameter vector, the offset parameter vector, and the normalized feature map, wherein the final feature map is a feature map after the preset adaptive normalization processing is completed.

Specifically, the preset adaptive normalization processing is first to divide the channel of the feature map to-be-processed into G groups, and normalize the feature value in the groups to the standard normal distribution in the same way as the group normalization. Then, the obtained facial feature vector and the obtained position feature vector obtained are spliced into a 1*128 feature vector, and two parameter vectors with the same length as the number of the channels are calculated through a layer of fully connected layers: the scaling parameter vector and the offset parameter vector. The final feature map is obtained by multiplying each channel of the normalized feature map to be processed by the corresponding value in the scaling parameter vector and adding the corresponding value in the offset parameter vector.

Optionally, in some embodiments, the preset adaptive normalization processing is as follows:

$$[W_{shift}, W_{scale}] = \text{LeakyRelu}(L(f_{rects}) f_{face}))$$

$$f_{out} = W_{scale} * GN(f_{in}) + W_{shift}$$

In the above equation, $f_{rects}$ is the position feature vector, $f_{face}$ is the facial feature vector, LeakyRelu ( ) is a preset leaky rectified linear activation unit, L ( ) denotes a fully connected layer, $W_{scale}$ is the scaling parameter vector, $f_{in}$ is the feature map to be processed, $f_{out}$ is the final feature map, GN ( ) denotes a preset normalization processing function, and $W_{shift}$ is the offset parameter vector.

Exemplarily, the preset leaky rectified linear activation unit LeakyRelu 0 is as follows:

$$y_i = \begin{cases} x_i & \text{when } x_i \geq 0 \\ \dfrac{x_i}{a_i} & \text{when } x_i < 0 \end{cases}$$

In the above equation, $y_i$ denotes the output of the activation function, $x_i$ denotes the input of the activation function, and $a_i$ is a constant, $a_i = 0.01$.

The embodiments of this application adopt a preset adaptive normalization processing to recalibrate the eye feature extracted by the neural network according to the user's facial appearance, so as to realize the purpose of guiding the extraction of user's eye feature based on the user's facial appearance, and ultimately improve the calculation accuracy of the gaze point position.

The fully connected layer network 63 includes a fully connected layer, and after the binocular fusion feature map is obtained through the feature fusion network, the dimensions of the binocular fusion feature map are first stretched, and then converted into a binocular fusion feature vector with a length of 128 through the connected layer.

S305, acquiring a gaze point of a user according to a preset second fully connected network, the facial feature vector, the position feature vector, and the binocular fusion feature vector.

Specifically, the facial feature vector, the eye-face position feature vector and the binocular fusion feature vector can be spliced to obtain a final splicing vector, and then the final splicing vector is used as an input to the preset second fully connected network, and the gaze point position information of the user can be output through the conversion by the second fully connected network.

Figure 7:
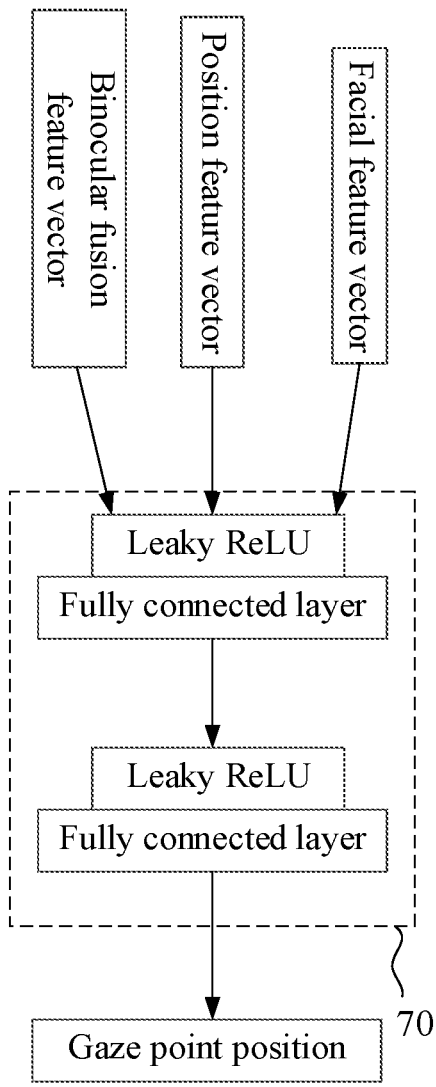
FIG. 7 is a schematic structural diagram of a preset second fully connected network provided by an embodiment of the present application.

Exemplarily, FIG. 7 is a schematic structural diagram of a preset second fully connected network provided by an embodiment of the present application, the preset second fully-connected network 70 includes two fully-connected layers as shown in FIG. 7. Exemplarily, the output length of the first fully-connected network can be 128, the output length of the second fully-connected network can be 2, and the length of the final splicing vector input into the first fully-connected network can be 256.

In an embodiment of the present application, the binocular fusion feature vector is obtained by performing the feature fusion on the left-eye image and the right-eye image by a convolutional neural network to a, and then the gaze point position of the user is estimated according to the facial feature vector, the eye-face position feature vector and the binocular fusion feature vector without splicing the left-eye feature vector and the right-eye feature vector, which avoids the loss of spatial information and improves the accuracy of the position point estimation.

Figure 8:
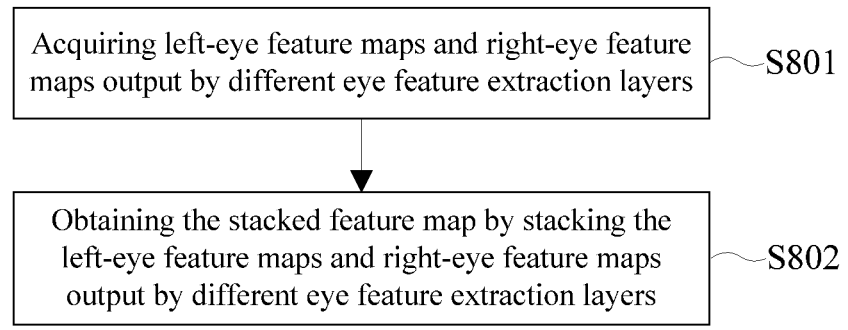
FIG. 8 is a schematic flowchart of a second embodiment of a gaze point estimation method provided by an embodiment of the present application.

FIG. 8 is a schematic flowchart of a second embodiment of a gaze point estimation method provided by an embodiment of the present application, as shown in FIG. 8, the above step of "obtaining the stacked feature map by stacking the left-eye feature map and the right-eye feature map" can be achieved by the following steps:

S801, acquiring left-eye feature maps and right-eye feature maps output by different eye feature extraction layers.

Specifically, FIG. 6 shows five eye feature extraction layers, the left-eye feature map and the right-eye feature map output by the second eye feature extraction layer 612, and the left-eye feature map and the right-eye feature map output by the fifth eye feature extraction layer 615 can be obtained for subsequent stacking. the left-eye feature map and the right-eye feature map output by the third-layer eye feature extraction layer 612, and the left-eye feature map and the right-eye feature map output by the fifth-layer eye feature extraction layer 615 can also be obtained for subsequent stacking.

S802, obtaining the stacked feature map by stacking the left-eye feature maps and right-eye feature maps output by different eye feature extraction layers.

Exemplarily, taking the left-eye feature map and the right-eye feature map output by the third eye feature extraction layer 613, and the left-eye feature map and the right-eye feature map output by the fifth eye feature extraction layer 615 as examples, the left-eye feature map and the right-eye feature map output by the third eye feature extraction layer 613 can be respectively identified as A and B, and the left-eye feature map and the right-eye feature map output by the fifth eye feature extraction layer 615 can be respectively identified as C and D. The stacked feature map is obtained by stacking A, B, C, and D together.

In the embodiment of the present application, a stacked feature map for subsequent feature fusion is formed by stacking the left eye feature maps and right eye feature maps output by different eye feature extraction layers. The stacked feature map not only retains more spatial information but also contains more advanced and complex features, which improves the accuracy of subsequent gaze point estimation.

In summary, the embodiments of the present application preserve more complete spatial information when fusing left-eye feature and the right-eye feature by stacking the left-eye feature maps and right-eye feature maps output by different eye feature extraction layers, compared with the spliced binocular feature vector in the conventional method, and has stronger spatial feature extraction capability by using a convolutional layer to fuse the binocular feature, compared with the use of a fully connected layer to fuse the binocular feature in the conventional method. Therefore, the spatial information of the eye feature can be better preserved and extracted when performing the binocular feature fusion to improve the accuracy of gaze point position calculation, and at the same time, when fusing the left-eye feature and the right-eye feature, the eye features can be extracted more accurately to improve the accuracy of the gaze point position calculation by using the attention weight assignment processing to dynamically adjust the weights of different features from the left and right eyes according to the appearance of the eyes. Finally, the facial feature vector and the position feature vector are used as the inputs for the preset adaptive normalization processing, and the eye feature maps (the left-eye feature map and the right-eye feature map) are adjusted according to the characteristics of facial appearance to improve the accuracy of the gaze point position calculation by using the intrinsic relationship between the human face and the eye appearance.

The following is the apparatus embodiment of the present application, which can be used to perform the method embodiment of this application. For details not disclosed in the apparatus embodiment of the present application, please refer to the method embodiment of the present application.

Figure 9:
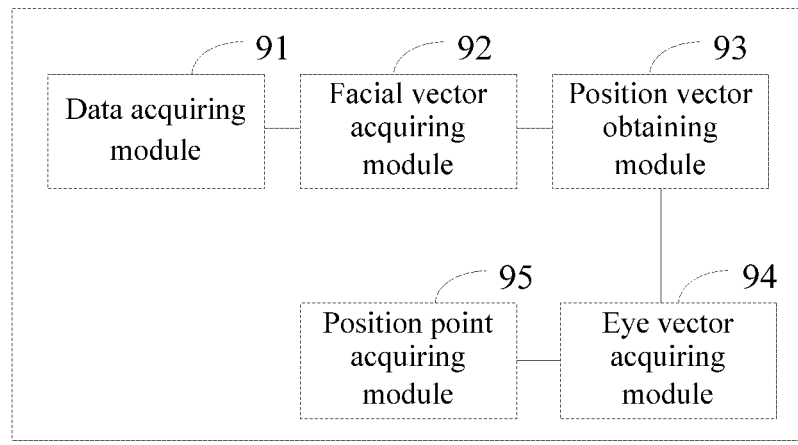
FIG. 9 is a schematic structural diagram of the gaze point estimation apparatus provided by an embodiment of the present application.

FIG. 9 is a schematic structural diagram of the gaze point estimation apparatus provided by an embodiment of the present application, as shown in FIG. 9, the apparatus can be applied to a mobile terminal or other devices with a display interface and a camera, the estimation apparatus 90 can include: a data acquiring module 91, a face vector acquiring module 92, a position vector acquiring module 93, an eye vector acquiring module 94, and a position point acquiring module 95.

The data acquiring module 91 is configured to acquire user image data, wherein the user image data comprises a facial image, a left-eye image, a right-eye image, and eye-face position data.

The facial vector acquiring module 92 is configured to acquire a facial feature vector according to a preset first convolutional neural network and the facial image.

The position vector obtaining module 93 is configured to acquire a position feature vector according to a preset first fully connected network and the position data.

The eye vector acquiring module 94 is configured to acquire a binocular fusion feature vector according to a preset eye feature fusion network, the left-eye image and the right-eye image.

The position point acquiring module 95 is configured to acquire a gaze point of a user according to a preset second fully connected network, the facial feature vector, the position feature vector, and the binocular fusion feature vector.

Exemplarily, based on the above embodiment, as an example, the preset first convolutional neural network includes a facial feature extraction network and a facial vector conversion network. The facial vector acquiring module 92 may be specifically configured to obtain a facial feature map by performing feature extraction on the facial image through the facial feature extraction network; obtain an initial facial feature vector by dimensionally stretching the facial feature map; and input the facial initial feature vector to the facial vector conversion network, and convert to obtain a facial feature vector with a preset size.

Exemplarily, based on the above embodiment, as an example, the preset eye feature fusion network includes an eye feature extraction network and a feature fusion network. The eye vector acquiring module 94 may be specifically configured to obtain a left-eye feature map and a right-eye feature map by performing feature extraction on the left-eye image and the right-eye image through the eye feature extraction network; obtain a stacked feature map by stacking the left-eye feature map and the right-eye feature map; obtain a binocular fusion feature map by performing feature fusion on the stacked feature map through the feature fusion network; and obtain the binocular fusion feature vector by stretching and length converting the binocular fusion feature map.

Exemplarily, based on the above embodiment, as an example, the eye vector acquiring module 94 may be specifically configured to acquire left-eye feature maps and right-eye feature maps output by different eye feature extraction layers; and obtain the stacked feature map by stacking the left-eye feature maps and right-eye feature maps output by different eye feature extraction layers.

Exemplarily, based on the above embodiment, as an example, an eye feature extraction network can be used to perform a preset adaptive normalization processing, and the eye vector acquiring module 94, when performing the preset adaptive normalization process, may be specifically configured to acquire a feature map to-be-processed, obtain a splicing vector by splicing the facial feature vector and the position feature vector; obtaining a normalized feature map by normalizing the feature map to be processed; and calculating a final feature map, wherein the final feature map is a feature map after the preset adaptive normalization processing is completed. The feature map to-be-processed is used for the preset adaptive normalization processing The estimation apparatus provided by the embodiment of the present application can be used to perform the method in the embodiments shown in FIG. 3 and FIG. 8, the implementation principles and technical effects therebetween are similar, which will not be repeated here.

It should be noted that the division of the various modules of the above device is only a logical functional division, and may be fully or partially integrated into a physical entity in actual implementation, or physically separated. And these modules can all be implemented in the form of software called through processing elements; they can also all be implemented in the form of hardware; they can also be partially implemented in the form of software called through processing elements and partially implemented in the form of hardware. For example, the data acquiring module can be a separate processing element, or it can be integrated into one of the chips of the above-mentioned device. In addition, it can be stored in the memory of the above-mentioned device in the form of program code, and one of the processing elements of the above-mentioned device calls and performs the functions of the above-mentioned data acquiring module. Other modules are implemented similarly. In addition, all or part of these modules can be integrated or implemented independently. The processing element here can be an integrated circuit with signal processing capabilities. In the implementation, the steps of the above method or each of the above modules can be accomplished by integrated logic circuits in hardware in the processor element or by instructions in the form of software.

For example, these modules may be one or more integrated circuits configured to implement the above methods, such as one or more application-specific integrated circuits (ASICs), or one or more microprocessors (digital signal processors, DSPs) or, one or more field-programmable gate arrays (FPGAs), etc. For another example, when one of the above modules is implemented in the form of a processing element that dispatches program code, the processing element may be a general-purpose processor, such as a central processing unit (CPU) or another processor that can call program code. Further, these modules can be integrated and implemented as a system-on-a-chip (SOC).

In the above-mentioned embodiments, an implementation may be in whole or in part by software, hardware, firmware, or any combination thereof. When implemented using software, it may be implemented in whole or in part in the form of a computer program product. A computer program product includes one or more computer instructions. When loaded and executed on the computer, the computer program instructions produce, in whole or in part, a process or function by an embodiment of the present application. The computer may be a general-purpose computer, a special-purpose computer, a computer network, or other programmable devices. Computer instructions may be stored in a computer-readable storage medium or transmitted from one computer-readable storage medium to another computer-readable storage medium. For example, computer instructions may be transmitted from a website, computer, server, or data center to another via wired (e.g., coaxial cable, fiber optic, digital subscriber line (DSL)) or wireless (e.g., infrared, wireless, microwave, etc.). The computer-readable storage medium may be any available medium that can be accessed by a computer or a data storage device such as a server or data center integrated with one or more available media. The available media may be magnetic media, (e.g., floppy disk, hard disk, magnetic tape), optical media (e.g., DVD), or semiconductor media (e.g., solid-state disk (SSD)), etc.

Figure 10:
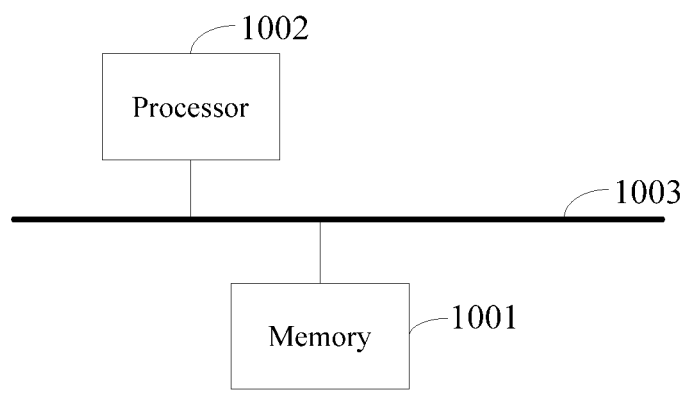
FIG. 10 is a schematic structural diagram of the electronic device provided by an embodiment of the present application.

Optionally, FIG. 10 is a schematic structural diagram of the electronic device provided by an embodiment of the present application, as shown in FIG. 10, the electronic device includes a memory 1001 and at least one processor 1002;

the memory 1001 stores computer-executed instructions; the processor 1002 executes the computer-executed instructions stored in the memory 1001 to enable the processor 1002 to perform the method steps as described above.

Exemplarily, the memory 1001 may be connected to the processor 1002 through the bus 1003. The processor 1002 may be a general-purpose processor, including a central processing unit CPU, a network processor (NP), etc.

Optionally, an embodiment of the present application also provides a computer-readable storage medium on which a computer program is stored, and when the computer program is executed by a processor, the method steps as described above are implemented.

In the present application, "at least one" refers to one or more, and "more than one" refers to two or more. The word "and/or" describes the association relationship of the associated objects and indicates that three relationships can exist, for example, A and/or B, which can indicate: the existence of A alone, the existence of both A and B, and the existence of B alone, where A and B can be singular or plural. The character "/" generally indicates that t the associated objects before and after being in a "or" relationship; in the formula, the character "I", indicates that the associated objects before and after are in a "division" relationship. The expression "at least one of the following" or its equivalent refers to any combination of these terms, including any combination of single or plural terms. For example, at least one of a, b, or c can mean a, b, c, a-b, a-c, b-c, or a-b-c, where a, b, and c can be single or multiple.

It should be understood that the various numerical numbers involved in the embodiments of the present application are only for descriptive convenience, and are not intended to limit the scope of the embodiments of the present application. In the embodiments of the present application, the size of the serial numbers of the above-mentioned processes does not imply the order of execution, and the order of execution of each process shall be determined by their function and intrinsic logic, and shall not constitute any limitation of the implementation process of the embodiments of the present application.

Finally, it should be noted that the above embodiments are only used to illustrate the technical solution of the present application, not to limit it; despite the detailed description of the present application with reference to the foregoing embodiments, it should be understood by those of ordinary skill in the art that it is still possible to modify the technical solution recorded in the foregoing embodiments, or to replace some or all of the technical features thereof with equivalent ones; and these modifications or replacements do not make the essence of the corresponding technical solutions deviate from the scope of the technical solutions of the embodiments of the present application.

What is claimed is:

1. A gaze point estimation method, comprising:
acquiring user image data, wherein the user image data comprises a facial image, a left-eye image, a right-eye image, and eye-face position data;
acquiring a facial feature vector according to a preset first convolutional neural network and the facial image;
acquiring a position feature vector according to a preset first fully connected network and the position data;
acquiring a binocular fusion feature vector according to a preset eye feature fusion network, the left-eye image and the right-eye image; and
acquiring position information about a gaze point of a user according to a preset second fully connected network, the facial feature vector, the position feature vector, and the binocular fusion feature vector;
wherein the preset eye feature fusion network comprises an eye feature extraction network and a feature fusion network, and the acquiring the binocular fusion feature vector according to the preset eye feature fusion network, the left-eye image and the right-eye image comprises:
obtaining a left-eye feature map and a right-eye feature map by performing feature extraction on the left-eye image and the right-eye image through the eye feature extraction network;
obtaining a stacked feature map by stacking the left-eye feature map and the right-eye feature map;
obtaining a binocular fusion feature map by performing feature fusion on the stacked feature map through the feature fusion network; and
obtaining the binocular fusion feature vector by stretching and length converting the binocular fusion feature map.

2. The method according to claim 1, wherein the preset first convolutional neural network comprises a facial feature extraction network and a facial vector conversion network, the acquiring the facial feature vector according to the preset first convolutional neural network and the facial image comprises:
obtaining a facial feature map by performing feature extraction on the facial image through the facial feature extraction network;
obtaining an initial facial feature vector by dimensionally stretching the facial feature map; and
inputting the initial facial feature vector to the facial vector conversion network, and converting to obtain a facial feature vector with a preset size.

3. The method according to claim 2, wherein the facial feature extraction network comprises more than two successively connected facial feature extraction layers, and the facial feature extraction layers are used for convolution processing, grouping normalization processing, activation processing, maximum pooling processing, and attention weight assignment processing.

4. The method according to claim 1, wherein the eye feature extraction network comprises more than two successively connected eye feature extraction layers, and the eye feature extraction layers are used for convolution processing, activation processing, group normalization processing, maximum pooling processing, preset adaptive normalization processing, and attention weight assignment processing, the feature fusion network comprises at least one feature fusion layer, wherein the feature fusion layer is used for attention weight assignment processing, compression activation processing, convolution processing, activation processing, and preset adaptive normalization processing.

5. The method according to claim 1, wherein the obtaining the stacked feature map by stacking the left-eye feature map and the right-eye feature map comprises:
acquiring left-eye feature maps and right-eye feature maps output by different eye feature extraction layers; and
obtaining the stacked feature map by stacking the left-eye feature maps and right-eye feature maps output by different eye feature extraction layers.

6. The method according to claim 4, wherein the preset adaptive normalization processing comprises:
acquiring a feature map to-be-processed, wherein the feature map to-be-processed is used for the preset adaptive normalization processing;
obtaining a splicing vector by splicing the facial feature vector and the position feature vector;
obtaining a scaling parameter vector and an offset parameter vector by inputting the splicing vector into a preset fully connected layer;
obtaining a normalized feature map by normalizing the feature map to be processed; and
calculating a final feature map according to the scaling parameter vector, the offset parameter vector, and the normalized feature map, wherein the final feature map is a feature map after the preset adaptive normalization processing is completed.

7. The method according to claim 6, wherein the calculating the final feature map according to the scaling parameter vector, the offset parameter vector, and the normalized feature map comprises:

$$[W_{shift}, W_{scale}] = \text{LeakyRelu}(L(f_{rects}, f_{face}))$$

$$f_{out} = W_{scale} * GN(f_{in}) + W_{shift}$$

in the above equation, $f_{rects}$ is the position feature vector, $f_{face}$ is the facial feature vector, LeakyRelu( ) is a preset leaky rectified linear activation unit, L( ) denotes a fully connected layer, $W_{scale}$ is the scaling parameter vector, $f_{in}$ is the feature map to be processed, $f_{out}$ is the final feature map, GN( ) denotes a preset normalization processing function, and $W_{shift}$ is the offset parameter vector.

8. An electronic device, comprising: a memory and at least one processor;
the memory is stored with computer-executed instructions; and
the computer-executed instructions stored in the memory are executed by the at least one processor to enable the at least one processor to:
acquire user image data, wherein the user image data comprises a facial image, a left-eye image, a right-eye image, and eye-face position data;
acquire a facial feature vector according to a preset first convolutional neural network and the facial image;
acquire a position feature vector according to a preset first fully connected network and the position data;
acquire a binocular fusion feature vector according to a preset eye feature fusion network, the left-eye image and the right-eye image; and
acquire position information about a gaze point of a user according to a preset second fully connected network, the facial feature vector, the position feature vector, and the binocular fusion feature vector;

wherein the preset eye feature fusion network comprises an eye feature extraction network and a feature fusion network, and the at least one processor is further configured to:
obtain a left-eye feature map and a right-eye feature map by performing feature extraction on the left-eye image and the right-eye image through the eye feature extraction network;
obtain a stacked feature map by stacking the left-eye feature map and the right-eye feature map;
obtain a binocular fusion feature map by performing feature fusion on the stacked feature map through the feature fusion network; and
obtain the binocular fusion feature vector by stretching and length converting the binocular fusion feature map.

9. The electronic device according to claim 8, wherein the preset first convolutional neural network comprises a facial feature extraction network and a facial vector conversion network, wherein the at least one processor is further configured to:
obtain a facial feature map by performing feature extraction on the facial image through the facial feature extraction network;
obtain an initial facial feature vector by dimensionally stretching the facial feature map; and
input the initial facial feature vector to the facial vector conversion network, and convert to obtain a facial feature vector with a preset size.

10. The electronic device according to claim 9, wherein the facial feature extraction network comprises more than two successively connected facial feature extraction layers, and the facial feature extraction layers are used for convolution processing, grouping normalization processing, activation processing, maximum pooling processing, and attention weight assignment processing.

11. The electronic device according to claim 8, wherein the eye feature extraction network comprises more than two successively connected eye feature extraction layers, and the eye feature extraction layers are used for convolution processing, activation processing, group normalization processing, maximum pooling processing, preset adaptive normalization processing, and attention weight assignment processing, the feature fusion network comprises at least one feature fusion layer, wherein the feature fusion layer is used for attention weight assignment processing, compression activation processing, convolution processing, activation processing, and preset adaptive normalization processing.

12. The electronic device according to claim 8, wherein the at least one processor is further configured to:
acquire left-eye feature maps and right-eye feature maps output by different eye feature extraction layers; and
obtain the stacked feature map by stacking the left-eye feature maps and right-eye feature maps output by different eye feature extraction layers.

13. The electronic device according to claim 11, wherein the preset adaptive normalization processing comprises:
acquiring a feature map to-be-processed, wherein the feature map to-be-processed is used for the preset adaptive normalization processing;
obtaining a splicing vector by splicing the facial feature vector and the position feature vector;
obtaining a scaling parameter vector and an offset parameter vector by inputting the splicing vector into a preset fully connected layer;
obtaining a normalized feature map by normalizing the feature map to be processed; and
calculating a final feature map according to the scaling parameter vector, the offset parameter vector, and the normalized feature map, wherein the final feature map is a feature map after the preset adaptive normalization processing is completed.

14. The electronic device according to claim 13, wherein the at least one processor is further configured to calculate the final feature map according to the scaling parameter vector, the offset parameter vector, and the normalized feature map through the following equation:

$$[W_{shift}, W_{scale}] = \text{LeakyRelu}(L(f_{rects}, f_{face}))$$

$$f_{out} = W_{scale} * GN(f_{in}) + W_{shift}$$

in the above equation, $f_{rects}$ is the position feature vector, $f_{face}$ is the facial feature vector, LeakyRelu ( ) is a preset leaky rectified linear activation unit, L ( ) denotes a fully connected layer, $W_{scale}$ is the scaling parameter vector, $f_{in}$ is the feature map to be processed, $f_{out}$ is the final feature map, GN ( ) denotes a preset normalization processing function, and $W_{shift}$ is the offset parameter vector.

* * * * *